United States Patent
Jankura et al.

(10) Patent No.: US 12,409,790 B2
(45) Date of Patent: Sep. 9, 2025

(54) VEHICLE MOUNT AND MOUNTING SYSTEM FOR MOBILE DEVICES

(71) Applicant: Peak Design, San Francisco, CA (US)

(72) Inventors: Robb Henry Jankura, San Francisco, CA (US); Arthur Viger, San Francisco, CA (US); Olivia Eaton, San Francisco, CA (US); Matthew Thomas James, San Francisco, CA (US); Andrew Wheeler Gans, San Francisco, CA (US)

(73) Assignee: Peak Design, San Francisco, CA (US)

( * ) Notice: Subject to any disclaimer, the term of this patent is extended or adjusted under 35 U.S.C. 154(b) by 128 days.

(21) Appl. No.: 18/303,112

(22) Filed: Apr. 19, 2023

(65) Prior Publication Data

US 2023/0331172 A1    Oct. 19, 2023

Related U.S. Application Data

(60) Provisional application No. 63/332,383, filed on Apr. 19, 2022.

(51) Int. Cl.
*B60R 11/02* (2006.01)
*B60R 11/00* (2006.01)

(52) U.S. Cl.
CPC ....... *B60R 11/02* (2013.01); *B60R 2011/0008* (2013.01); *B60R 2011/0059* (2013.01)

(58) Field of Classification Search
CPC ..... B60R 2011/0008; B60R 2011/0059; B60R 11/02; B60R 2011/007; B60R 11/0241
See application file for complete search history.

(56) References Cited

U.S. PATENT DOCUMENTS

| | | |
|---|---|---|
| 11,548,451 B2 | 1/2023 | Jankura et al. |
| 2010/0294818 A1 | 11/2010 | Lafargue et al. |
| 2014/0063629 A1* | 3/2014 | Qian .......................... B60R 1/04 |
| | | 359/844 |
| 2016/0347257 A1 | 12/2016 | Buchanan |
| 2016/0373152 A1* | 12/2016 | Schmidt ................. A45C 11/00 |
| 2017/0072872 A1* | 3/2017 | Balmer ................... B60R 11/02 |
| 2018/0043840 A1* | 2/2018 | Minn .................. B60R 11/0241 |
| 2018/0134231 A1 | 5/2018 | Richter |
| 2019/0241129 A1* | 8/2019 | Song ................... B60R 11/0241 |
| 2021/0041057 A1* | 2/2021 | Jankura ................ F16M 13/022 |
| 2021/0046885 A1* | 2/2021 | Jankura ..................... F16B 2/04 |
| 2023/0054404 A1 | 2/2023 | Jankura et al. |

FOREIGN PATENT DOCUMENTS

KR    2020-0097166    8/2020

OTHER PUBLICATIONS

International Search Report and Written Opinion in PCT/US23/19047 dated Jul. 19, 2023.

* cited by examiner

*Primary Examiner* — Adam J Waggenspack
(74) *Attorney, Agent, or Firm* — Licata & Tyrrell P.C.; Bridget C. Sciamanna

(57) ABSTRACT

A vent mount and vent mounting system for a mobile device with upper and lower retention features and a pivot control with means for attaching a mobile device and positioning of any attached mobile device is provided.

10 Claims, 2 Drawing Sheets

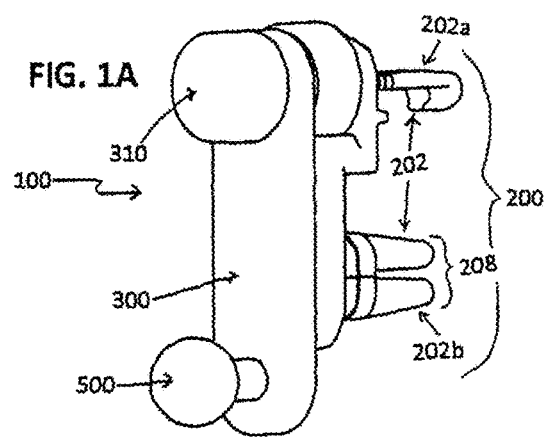
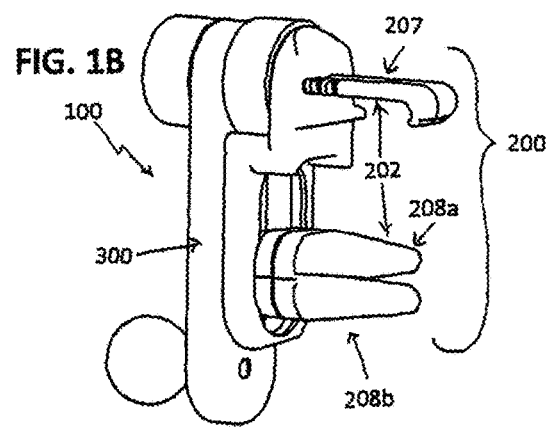
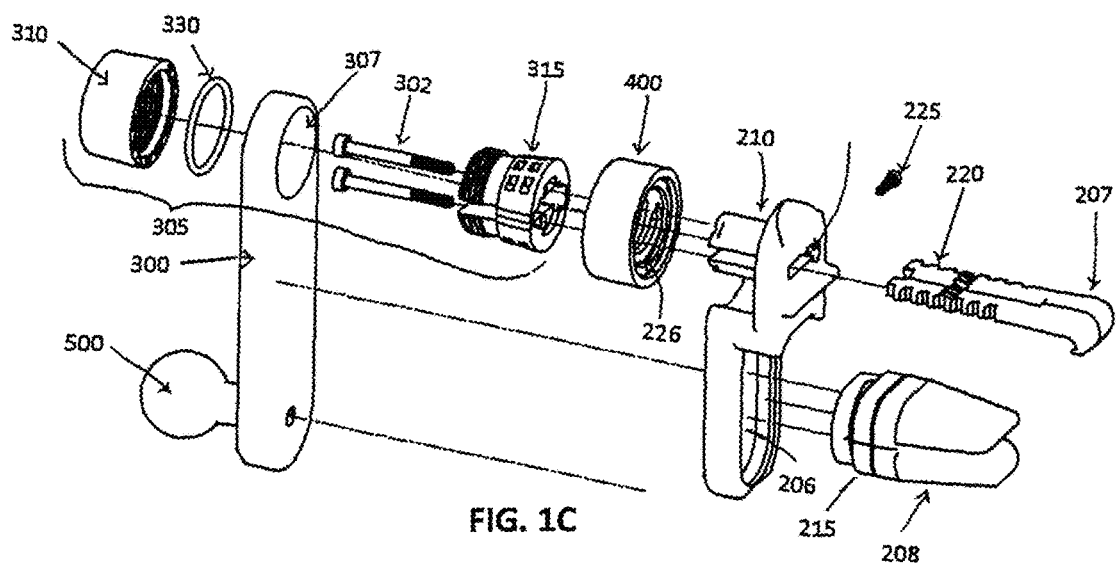

VEHICLE MOUNT AND MOUNTING SYSTEM FOR MOBILE DEVICES

CROSS-REFERENCE TO RELATED APPLICATIONS

This patent application claims the benefit of priority to U.S. Provisional Application Ser. No. 63/332,383, filed Apr. 19, 2022, teachings of which are incorporated by reference in their entirety.

BACKGROUND OF THE INVENTION

U.S. Pat. No. 11,548,451 and U.S. Published Application Nos. 2023/0054504 and 2021/0041057 disclose vehicle mounts for mobile devices that can include an emplacement mechanism configured to affix the mount to a surface of the vehicle. For example, the vehicle mount can include a pressure-sensitive adhesive backing configured to affix the vehicle mount to a surface of a dashboard and/or console in a vehicle. A user may press the vehicle mount onto a (flat) surface of the dashboard or console within her vehicle to semi-permanently affix the vehicle mount to the vehicle.

In another example, the vehicle mount can include: an emplacement mechanism defining a vent locking mechanism. The vent locking mechanism can include a set of vent jaws configured to spread to fill the area of a vent in a vehicle and pull the mount inwards to securely lock the vehicle mount in place to enable the mounting system to remain in place if the car is subjected to turbulent conditions (e.g., a bumpy road or highway).

SUMMARY OF THE INVENTION

An aspect of this disclosure relates to a vehicle mount for a mobile device. The vehicle mount of this disclosure attaches to a vehicle vent and comprises a vent lock assembly with a set of vent retention features configured to transiently couple to one or more vent blades of a vehicle vent and a connector for a mobile device pivotably coupled to the vent lock assembly.

In one nonlimiting embodiment, one of the vent retention features of the set has a first end with a curved hook which is configured to transiently couple a vent blade of a vehicle vent and a second end comprising a threaded section configured to translate along a first axis within a receptacle to move the curved hook between a retracted position and extended positions at which the curved hook can transiently couple to a vent blade.

In one nonlimiting embodiment, one of the vent retention features of the set is a clip with an upper clip section configured to mate with an upper edge of a vent blade in a vehicle vent and a lower clip section configured to mate with a lower edge of the vent blade in the vehicle vent configured to cooperate with the upper clip section to transiently couple the vent mount to the vehicle vent blade.

In one nonlimiting embodiment, the set of vent retention features comprises an upper vent retention feature and a lower vent retention feature with the upper vent retention feature comprising a first end with a curved hook configured to transiently couple a vent blade of a vehicle vent and a second end comprising a threaded section configured to translate along a first axis within a receptacle to move the curved hook between a retracted position and extended positions at which the curved hook can transiently couple to the vent blade and the lower vent retention feature comprising a clip with an upper clip section configured to mate with an upper edge of a vent blade of a vehicle vent and a lower clip section configured to mate with a lower edge of the vent blade in the vehicle vent configured to cooperate with the upper clip section to transiently couple the vent mount to the vehicle vent blade.

In one nonlimiting embodiment, the connector of the vehicle vent mount comprises a first end configured to rigidly couple to a mount body for a mobile device and a second end rotatably coupled to the vent lock assembly.

Another aspect of the disclosure relates to a vehicle mounting system for a mobile device comprising a vehicle vent mount with a vent lock assembly with a set of vent retention features configured to transiently couple to one or more vent blades of a vehicle vent and a connector for a mobile device pivotably coupled to the vent lock assembly and a mobile device case capable of mounting to the connector.

BRIEF DESCRIPTION OF DRAWINGS

FIGS. 1A, 1B and 1C are diagrams of a front view (FIG. 1A) and back view (FIG. 1B) of a nonlimiting embodiment of a vehicle mount for a mobile device with upper and lower vent retention features and pivot control with means for attaching a mobile device and for positioning the mobile device away from the vent as well as a diagram showing elements of a nonlimiting embodiment of a curved hook retention feature and pivot control of a vehicle mount of this disclosure (FIG. 1C).

DETAILED DESCRIPTION OF THE INVENTION

Figure 2:
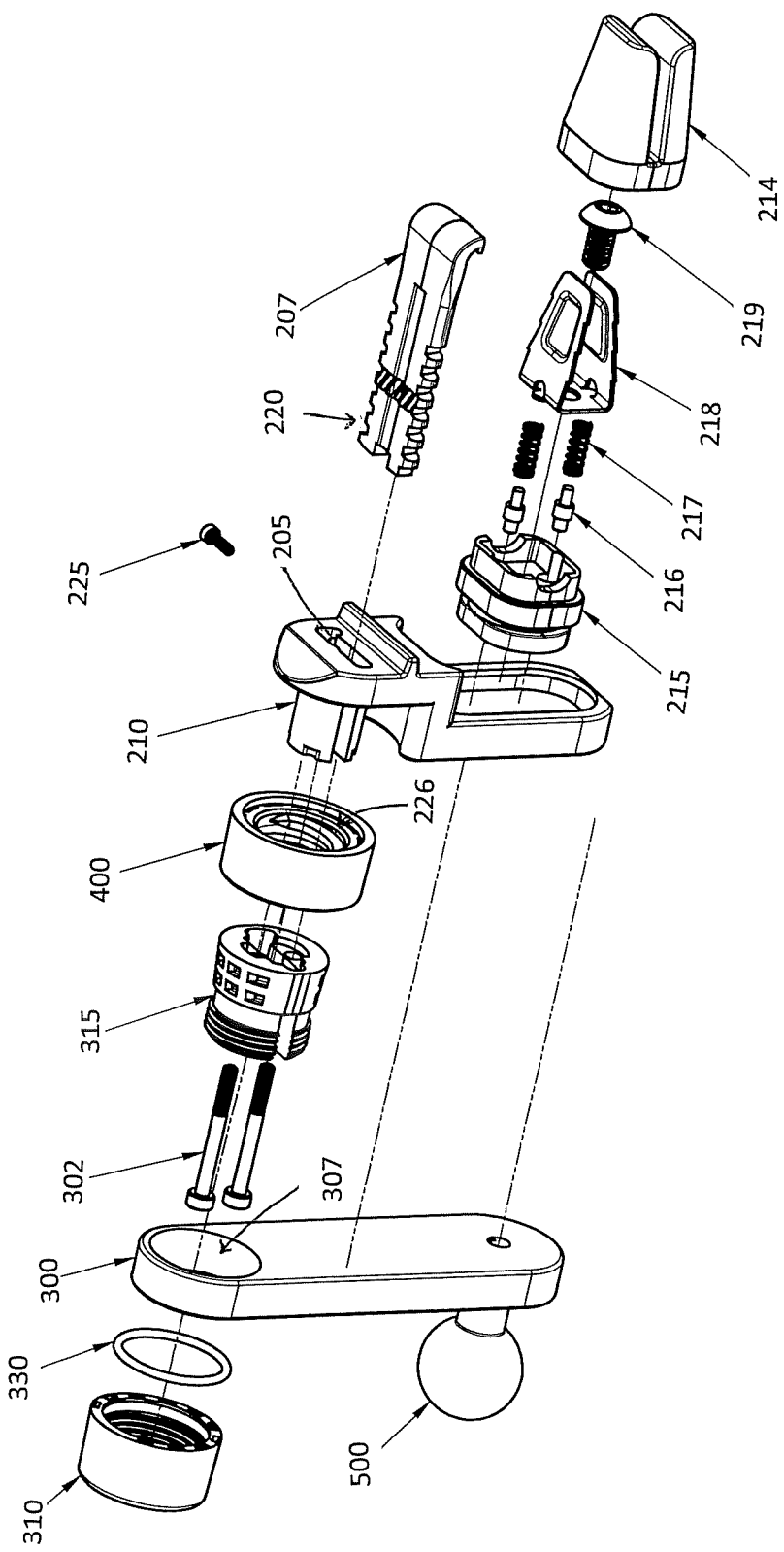
FIG. 2 is a diagram showing a more detailed nonlimiting embodiment of the curved hook retention feature, the clip retention feature and the pivot control of a vehicle mount of this disclosure.

Disclosed herein are vehicle mounts and vehicle mount systems for a mobile device which attach to a vent of the vehicle without blocking the vehicle vent with the mobile device.

FIGS. 1A, 1B, 1C and 2 depict embodiments of vehicle mount 100 configured to mount a mobile device case to a vehicle vent (e.g., vent blades of an automobile air vent).

In simplest form, the vehicle mount 100 comprises a vent lock assembly 200 with a set of vent retention features 202 configured to transiently couple to one or more vent blades of a vehicle vent and a connector 300, also referred to as a swivel arm, for a mobile device pivotably coupled to the vent lock assembly 200.

In one nonlimiting embodiment, one of the vent retention features of the set has a first end with a curved hook 207, also referred to as a blade hook, which is configured to transiently couple a vent blade of a vehicle vent and a second end comprising a threaded section 220 configured to translate along a first axis within a receptacle 205 to move the curved hook between a retracted position and extended positions at which the curved hook 207 can transiently couple to a vent blade.

In one nonlimiting embodiment, one of the vent retention features of the set is a clip 208 with an upper clip section 208a configured to mate with an upper edge of a vent blade in a vehicle vent and a lower clip section 208b configured to mate with a lower edge of the vent blade in the vehicle vent and to cooperate with the upper clip section 208a to transiently couple the vent mount to the vehicle vent blade.

In one nonlimiting embodiment, the set of vent retention features comprises an upper vent retention feature 202a and a lower vent retention feature 202b with the upper vent retention feature 202a comprising the curved hook configuration and the lower vent retention feature 202b comprising the clip configuration. However, as will be understood by the skilled artisan upon reading this disclosure, alternative arrangements of the retention features are encompassed within the scope of this invention.

In one nonlimiting embodiment, the curved hook section of the upper retention feature is integral to the upper retention feature and extends from a first distal end of the upper retention feature and bends or curves at an angle from the first distal end to locate the set of vent blades at a target position in agreement with the angle when the curved hook section is coupled to a first blade in the set of vent blades. Additionally, the threaded section of the upper retention feature includes outer threads defining a first set of teeth formed along a first lateral edge of the upper retention feature and extending from a second distal end of the upper retention feature opposite the first retention feature and a second set of teeth formed along a second lateral edge of the upper retention feature opposite the first lateral edge and extending from the second distal end of the upper retention feature opposite the first retention feature. In this nonlimiting embodiment, the first and second set of teeth can cooperate to define a set of positions of the upper retention feature including fully and partially retracted and fully and partially extended positions.

The vent lock assembly 200 may further comprise a vent lock body 210, a retention control ring 400, and a pivot control assembly 305 along with the set of retention features 202.

In one nonlimiting embodiment, the vent lock body 210, also referred to herein as a lock body or anchor arm, comprises an upper lock body or upper portion defining a ring seat and a lower lock body or lower portion extending below the upper lock body. The vent lock body may further define a set of receptacles including an upper receptacle 205 located in the upper portion of the lock body and a lower receptacle 206 located in the lower portion of the lock body. In this nonlimiting embodiment, the ring seat of the upper lock body is arranged about the upper receptacle.

In one nonlimiting embodiment, the clip vent retention feature further comprises a base member 215 configured to translate along a second axis, orthogonal to the first axis, within the lower receptacle 206 to adjust a distance of the clip retention feature relative to other retention features in the set. In this nonlimiting embodiment, the clip member may be removably coupled to the base member.

A more detailed nonlimiting embodiment of a clip vent retention feature is depicted in FIG. 2. In this nonlimiting embodiment, the base member 215 is a friction base clamp and is coupled to a friction clamp spring 218 with one or more friction clamp lock pins 216, one or more friction clamp lock springs 217 and a friction clamp assembly bolt 219. In this nonlimiting embodiment, the friction clamp spring 218 is covered with a friction clamp skin 214.

In an alternative nonlimiting embodiment, the lower retention feature can include a pad insert configured to transiently couple to the base member in replacement of the clip member. The pad insert can be configured to contact surfaces of the vent and/or vehicle to support the vent mount against these surfaces without any scratching or scuffing of these surfaces. For example, a user may remove the clip member from the base member, couple the pad insert to the base member, and adjust the upper retention feature to couple to a first vent blade in a vent in the vehicle, such that the pad insert abuts a surface of the vehicle below the first vent blade.

In one nonlimiting embodiment, a retention control ring 400, also referred to as a hook drive wheel, is arranged about the upper receptacle 205 seated within the ring seat of the upper portion of the lock body 210 and includes a set of inner threads 226 configured to mate with the threaded section 220 of the curved hook retention feature. In one nonlimiting embodiment, the vehicle mount may further comprise a hook limit bolt 225 positioned in the upper portion of the lock body which further controls the range to which the curved hook retention feature can be extended. The retention control ring may be configured to rotate the set of inner threads to translate the curved hook retention feature along the first axis in an extending direction responsive to rotation in a first direction about the lock body and rotate the set of inner threads to translate the curved hook retention feature along the first axis in a retracting direction opposite the extending direction responsive to rotation in a second direction about the lock body.

In one nonlimiting embodiment, the pivotably coupled connector 300 includes a first end configured to rigidly couple to a mount body for a mobile device case and a second end rotatably coupled to the vent lock assembly. The first end of the connector may further comprise a coupling feature, such as, but not limited to, a screw, configured to mate with a corresponding coupling feature of a mount body to rigidly affix the connector to the mount body. In one nonlimiting embodiment, the second end of the connector 300 comprises a retention control ring section 400, also referred to as a hook drive wheel, defining a spherical bore seated around a connector-receiving section 315, such as, but not limited to a cylindrical section or chassis nut, to rotatably couple the connector to the vent lock assembly. In one nonlimiting embodiment, the hook drive wheel and chassis nut are fastened via one or more chassis assembly bolts 302.

In one nonlimiting embodiment, the connector has a hole 307 at its upper end through which a pivot control assembly 305 is provided inclusive of a connector-receiving section 315 such as a cylindrical section and a pivot control 310, also referred to as a swivel lock cap. In one nonlimiting embodiment, the pivot control assembly includes a gasket 330 such as lock cap O-ring or another rubber, plastic, or metal gasket that cooperates with a shape of the front face of the cylindrical section and is configured to form a seal disposed between the front face of the cylindrical section and the retention control ring. Further, in this embodiment, the pivot control can define a cover including a threaded inner portion configured to translate along the threaded outer portion of the cylindrical section and to be actuated in a first rotational direction (e.g., clockwise) by a user to drive the cover into the connector, to drive the connector against surfaces of the retention control ring, and to lock the orientation of the connector relative the vent lock assembly and configured to be actuated in a second rotational direction (e.g., counterclockwise) by the user to drive the cover away from the connector, to release the connector from surfaces of the retention control ring, and to unlock the orientation of the connector relative the vent lock assembly. Accordingly, in this nonlimiting embodiment, the cylindrical section is further coupled to the retention control ring 400 and includes an outer threaded portion configured to mate with corresponding inner threads of the pivot control 310 to act as the connector-receiving section 315 and couple the pivot control assembly 305 to the upper portion of the lock body 210 and define a channel contiguous with the upper receptacle 205 and configured to receive a curved hook upper retention feature in its retracted position. In this nonlimiting embodiment, the pivot control 310 is arranged over the threaded portion of the cylindrical section and configured to rotate along the outer threaded portion of the cylindrical section in a first direction to clamp the ring section of the connector against surfaces of the retention control ring to fix an orientation of the connector relative the lock body responsive to rotation in the first direction; and rotate along the outer threaded portion of the cylindrical section in a second direction to release the ring section from the retention control ring and unlock the orientation of the connector relative the lock body responsive to rotation in the second direction.

In some nonlimiting embodiments, a threaded ball head 500 is positioned at the lower end of the connector or swivel arm.

In one nonlimiting embodiment, the connector further comprises a mount body inclusive of a first set of magnetic elements arranged in a first pattern and configured to transiently couple to a second set of magnetic elements of the mobile device case to transiently retain the outer surface of the device mount body against a rear face of the mobile device case.

In one nonlimiting embodiment, the device mount body further comprises a boss extending from an inner face of the device mount body and configured to insert into bore of the mobile device case. Additionally and/or alternatively, in another embodiment, the device mount body may comprise a set of locking jaws arranged on the boss configured to transiently mate with a set of undercut sections in bore of the mobile device case to further constrain the boss within the bore. Additionally and/or alternatively, in yet another nonlimiting embodiment, the device mount body may comprise a charging element housed within the device mount body inset from the first set of magnetic elements and configured to inductively charge a mobile device installed within the mobile device case.

Nonlimiting examples of device mount bodies useful in this vehicle mount are disclosed in U.S. Pat. No. 11,548,451 and U.S. Published Application Nos. 2023/0054504 and 2021/0041057, teachings of which are incorporated herein by reference.

Also provided by this disclosure are vehicle mounting systems for a mobile device comprising a vehicle vent mount as disclosed herein and a mobile device case capable of mounting to the connector of the vehicle vent mount.

In one nonlimiting embodiment, the device case comprises an insert including a bore with a set of undercut sections arranged about the bore and a second set of magnetic elements arranged in a second pattern about the bore. The bore may be any shape including, but in no way limited to, circular, oval, rectangular, polygonal, square, triangular or combinations thereof as well as alternative shape configurations designed by those of skill in the art. While the bore is described herein as having an undercut section arranged about the bore, it is also understood that the case could be configured without undercuts or so that undercut sections are designed around the bore. Nonlimiting examples of device cases useful in the vent mounting system are disclosed in U.S. Pat. No. 11,548,451 and U.S. Published Application Nos. 2023/0054504 and 2021/0041057, teachings of which are incorporated herein by reference.

The vehicle mount and mounting systems of this disclosure are configured to rigidly engage a set of vent blades (e.g., a set of horizontal, parallel air vent blades arranged over an air vent within a vehicle); and transiently engage and retain a device case housing a mobile device (e.g., a smartphone) in order to affix the device case to the set of vent blades.

These vehicle mounts and mounting systems inclusive of a device mount body configured to transiently receive and retain the device case against a mounting surface of the device mount body, a vent lock assembly including a set of retention features configured to affix the vent mount to a set of vent blades, and a connector rotatably coupled to the vent lock assembly and configured to rigidly couple to the device mount body and to rotate about a pivot axis (e.g., defined by the upper retention feature) on the vent lock assembly, can be used to mount a mobile device in the vehicle mount and then adjust the position of the device mount body relative the vent lock assembly.

In particular, the device mount body includes a set of magnetic features configured to transiently couple (e.g., magnetically couple) with a corresponding set of magnetic features within the device case to retain a rear face of the device case against the mounting surface of the device mount body (e.g., in a particular orientation). The vent lock assembly includes a lock body defining an upper receptacle and a lower receptacle, an upper retention feature configured to translate along a first axis (e.g., horizontally) within the upper receptacle to extend into the vent in a first direction around a first set of vent blades and retract in a second direction opposite the first direction against the first set of vent blades to transiently engage and retain the first set of vent blades in a target position, and a lower retention feature configured to translate along a second axis (e.g., vertically) orthogonal the first axis within the lower receptacle to adjust a distance between the upper retention feature and the lower retention feature and to transiently engage and retain a second set of vent blades below the first set of vent blades in the vent. The upper and lower retention features can therefore cooperate to locate the set of vent blades in a target position and rigidly lock the vehicle mount to the set of vent blades in this target position.

Furthermore, the pivotably coupled connector of the vehicle mount configured to rigidly couple to the device mount body and rotatably couple to the vent lock assembly permits a user to adjust a position of the mobile device relative to the vent without requiring adjustment and/or repositioning of the vent lock assembly.

In one nonlimiting embodiment, the upper retention feature is configured to seat within the upper receptacle of the lock body and extend normally (e.g., outward) from a front face of the lock body at a selected length. The upper retention feature can include a first end defining a curved hook section configured to engage a first vent blade in order to locate the set of vent blades in a target position and attach the vent mount to the vent, and a second end opposite the first end and defining a threaded section configured to translate within the upper receptacle to transition the curved hook section between a retracted position, in which the curved hook section is fully retracted up against the upper region of the lock body at a minimum distance from the lock body, and an extended position in which the curved hook section is fully extended into the vehicle vent at a maximum distance from the lock body.

Additionally, in this nonlimiting embodiment, the lock body can define a ring seat arranged about a portion of the upper receptacle opposite the vent. The vent lock assembly can include a retention control ring arranged within the ring seat about the portion of the upper receptacle and including a set of inner threads mated with the threaded section of the upper retention feature. The retention control ring can therefore be configured to selectively set the upper retention feature at a target distance normal to the front face of the lock body responsive to application of a force (e.g., rotational force) to the retention control ring. Accordingly, a user may rotate the retention control ring in a first direction to extend the upper retention feature outwardly from the lock body and insert the curved hook section of the upper retention feature into the vent and over a first vent blade, and then rotate the retention control ring in a second direction, opposite the first direction, to retract the upper retention feature inwardly toward the lock body and to draw an inner surface of the curved hook section against the vent blade.

Furthermore, in this nonlimiting embodiment, the lower retention feature can include a base member slidably coupled to the lower receptacle; and a clip member with an upper and lower clip, such as, but not limited to, a clip as depicted in FIG. 2, removably coupled to the base member and configured to engage a second vent blade in the vent or a second vent and cooperate with the curved hook section of the upper retention feature to rigidly lock the vehicle mount to a set of vent blades in a selected target position. The user can therefore adjust the position of the base member within the lower receptacle to adjust a distance between the upper and lower retention features, thus enabling the user to couple the vehicle mount to vents and/or vent blades of various sizes and/or configurations.

By coupling the upper retention feature and the lower retention feature to the vent blades at two vertically offset positions, the vent lock can constrain rotation of the vehicle mount and any device case coupled thereto relative to the vent and regardless of force (e.g., a torque) applied to the vent mount by the user's mobile device and/or movement of the user's vehicle. The vehicle mounts and mounting systems disclosed herein thus enable a user to selectively locate the upper retention feature and the lower retention feature in order to couple the vehicle mount at a target location for a set of vent blades regardless of the position of the set of vent blades and rigidly lock the mount to a set of vent blades at a target position to optimally stabilize the mount and any mobile device mounted thereto and prevent any displacement during operation of the mobile device and vehicle.

In one nonlimiting embodiment, the upper receptacle is configured to receive the upper retention feature there through in order to couple the upper retention feature to the lock body and cooperate with a particular shape of the upper retention feature in order to enable slidable adjustment of the upper retention feature along the first axis (e.g., horizontal direction) through the upper receptacle.

Accordingly, this vehicle mount enables a user to adjust the first retention feature independently from the second retention feature in order to locate the first retention feature and the second retention feature to a set of vent blades regardless of dimensions and positions of the set of vent blades.

The vent lock assembly can include a set of retention features slidably coupled to the lock body and configured to translate within to the set of receptacles of the lock body. Further, the set of retention features can be configured to mate with the set of vent blades to rigidly couple the vent lock assembly and therefore couple the mount body and/or a device case coupled to the mount body to the set of vent blades.

The vehicle mounts and mounting systems of this disclosure enable a user to selectively locate the upper retention feature from the upper receptacle to couple a vent blade regardless of the width of the vent blade and automatically locates the set of vent blades into a target position for receiving the second retention feature.

Further, the vehicle mount and mount system of this disclosure, inclusive of the connector or swing arm with the pivot control assembly allows a user to quickly lock and/or unlock an orientation of the connector rigidly coupled to the device mount body coupled to the device case containing the user's mobile device to adjust a position of the mobile device relative the vent by rotating the pivot control in the clockwise and/or counterclockwise directions, without decoupling the vent mount from the vent. Via this vehicle mount, the mobile device can be position so that is does not cover or block the vehicle vent to which it is mounted.

As a person skilled in the art will recognize from the previous detailed description and from the figures and claims, modifications and changes can be made to the embodiments of the invention without departing from the scope of this invention as defined in the following claims.

The invention claimed is:

1. A vehicle mount for a mobile device comprising:
   (a) a vent lock assembly comprising a set of vent retention features configured to transiently couple to one or more vent blades of a vent, said set of vent retention features comprising:
      (i) an upper vent retention feature comprising a first end with a curved hook configured to transiently couple a vent blade of a vehicle vent and a second end comprising a threaded section configured to translate along a first axis within a receptacle to move the curved hook between a retracted position and extended positions at which the curved hook can transiently couple to the vent blade; and
      (ii) a lower vent retention feature comprising a clip with an upper clip section configured to mate with an upper edge of a vent blade of a vehicle vent and a lower clip section configured to mate with a lower edge of the vent blade in the vehicle vent configured to cooperate with the upper clip section to transiently couple the vent mount to the vehicle vent blade; and
   (b) a connector for a mobile device pivotably coupled to the vent lock assembly.

2. The vehicle mount of claim 1 wherein the connector comprises a first end configured to rigidly couple to a mount body for a mobile device and a second end rotatably coupled to the vent lock assembly.

3. The vehicle mount of claim 2 wherein the mount body for the mobile device comprises one or more magnetic elements configured to transiently couple to a mobile device case to transiently retain an outer surface of the device mount against a rear face of a mobile device case.

4. The vehicle mount of claim 2 wherein the mount body comprises a boss extending outward from the mount body and configured to insert into a bore of a mobile device case.

5. The vehicle mount of claim 3 wherein the mount body for the mobile device further comprises a boss extending outward from the mount body and configured to insert into a bore of a mobile device case.

6. The vehicle mount of claim 4 wherein the mount body comprises a set of locking jaws arranged on the boss configured to transiently mate with a set of undercut sections in a bore of a mobile device case to constrain the boss within the bore of the mobile device case.

7. The vehicle mount of claim 2 further comprising a charging element housed within the mount body.

8. The vehicle mount of claim 1 wherein the connector is pivotably coupled via a pivot control assembly comprising a pivot control with inner threads and a cylindrical section coupled to a retention control ring comprising an outer threaded portion configured to mate with corresponding inner threads of the pivot control so that the connector can rotate and be locked in a selected position.

9. The vehicle mount of claim 8 wherein the selected position is away from a vent.

10. A vent mount system comprising the vehicle mount of claim 1 and a mobile device case which transiently attaches to the connector.

* * * * *